(12) United States Patent
Thompson

(10) Patent No.: US 8,640,988 B2
(45) Date of Patent: Feb. 4, 2014

(54) LANDING GEAR WITH COMPOSITE LEAF SPRING

(75) Inventor: Robert Ian Thompson, Bristol (GB)

(73) Assignee: Airbus UK Limited, Bristol (GB)

( * ) Notice: Subject to any disclaimer, the term of this patent is extended or adjusted under 35 U.S.C. 154(b) by 486 days.

(21) Appl. No.: 12/918,492

(22) PCT Filed: Feb. 24, 2009

(86) PCT No.: PCT/GB2009/050181
§ 371 (c)(1),
(2), (4) Date: Aug. 20, 2010

(87) PCT Pub. No.: WO2009/109771
PCT Pub. Date: Sep. 11, 2009

(65) Prior Publication Data
US 2011/0031348 A1    Feb. 10, 2011

(30) Foreign Application Priority Data
Mar. 5, 2008 (GB) .................................. 0804078.4

(51) Int. Cl.
*B64C 25/58* (2006.01)
*B64C 25/10* (2006.01)

(52) U.S. Cl.
USPC ............. 244/104 LS; 244/102 R; 244/102 A; 244/104 R

(58) Field of Classification Search
USPC .... 244/100 R, 102 R, 102 A, 104 LS, 104 R, 244/103 R
See application file for complete search history.

(56) References Cited

U.S. PATENT DOCUMENTS

| | | | | | |
|---|---|---|---|---|---|
| 1,376,912 | A | * | 5/1921 | Ajello ........................ | 244/104 R |
| 1,496,200 | A | * | 6/1924 | Baumann et al. .......... | 244/102 A |
| 1,940,836 | A | * | 12/1933 | Ayer .......................... | 244/102 R |
| 2,105,374 | A | * | 1/1938 | Saulnier .................. | 244/104 LS |
| 2,158,300 | A | * | 5/1939 | Page, Jr. .................... | 244/102 R |
| 2,534,722 | A | * | 12/1950 | Meiklejohn, Jr. et al. .... | 244/104 LS |

(Continued)

FOREIGN PATENT DOCUMENTS

DE    2747697 A1    4/1979
FR    1498165 A    10/1967

(Continued)

OTHER PUBLICATIONS

ISR for PCT/GB2009/050181 mailed Jan. 28, 2010.

(Continued)

*Primary Examiner* — Tien Dinh
*Assistant Examiner* — Steven Hawk
(74) *Attorney, Agent, or Firm* — Lowe Hauptman & Ham, LLP

(57) ABSTRACT

An aircraft landing gear comprising: an arm mounted to a pivot and carrying one or more wheel assemblies; and a composite leaf spring which is coupled to the arm and arranged to provide a resilient biasing force which opposes rotation of the arm about the pivot. The arm can be made relatively stiff in comparison with the leaf spring, so that load is transferred directly into the pivot without a large amount of bending of the leg. The leaf spring shock absorber typically has a reduced part count compared with a conventional oleo-pneumatic shock absorber. By forming the leaf spring from a composite material, its weight is significantly reduced in comparison with a conventional metal spring, making it suitable for use on a relatively large aircraft.

21 Claims, 7 Drawing Sheets

(56) References Cited

U.S. PATENT DOCUMENTS

| | | | | |
|---|---|---|---|---|
| 2,772,060 | A * | 11/1956 | Bendicsen | 244/102 R |
| 2,974,909 | A * | 3/1961 | Perdue | 244/102 R |
| 3,042,345 | A * | 7/1962 | Holland, Jr. | 244/104 R |
| 3,128,971 | A * | 4/1964 | Daffer | 244/104 R |
| 3,384,331 | A * | 5/1968 | Palmer | 244/102 R |
| 4,422,603 | A * | 12/1983 | Turiot et al. | 244/102 R |
| 5,337,976 | A * | 8/1994 | Derrien | 244/102 A |
| 6,802,476 | B2 * | 10/2004 | Collet et al. | 244/100 R |
| 7,467,763 | B2 * | 12/2008 | Kismarton | 244/104 LS |
| 7,475,849 | B2 * | 1/2009 | Lindahl et al. | 244/102 A |
| 2008/0308672 | A1 * | 12/2008 | Lindahl et al. | 244/102 A |
| 2009/0076668 | A1 * | 3/2009 | Lynas et al. | 244/102 A |

FOREIGN PATENT DOCUMENTS

| | | |
|---|---|---|
| GB | 1333558 A | 10/1973 |
| GB | 2271747 A | 4/1994 |
| WO | 9418019 A1 | 8/1994 |

OTHER PUBLICATIONS

British Search Report for GB0804078.4 dated Jun. 6, 2008.

* cited by examiner

LANDING GEAR WITH COMPOSITE LEAF SPRING

RELATED APPLICATIONS

The present application is based on International Application Number PCT/GB2009/050181, filed Feb. 24, 2009, and claims priority from, British Application Number GB0804078.4, filed Mar. 5, 2008, the disclosures of which are hereby incorporated by reference herein in their entirety.

FIELD OF THE INVENTION

The present invention relates to a landing gear with a composite leaf spring.

BACKGROUND OF THE INVENTION

A non-retractable landing gear with a composite leg carrying a wheel is described in US2006/0284009. In a loaded position the composite leg is bent upwardly by the forces associated with landing the aircraft. This arrangement suffers from a number of problems. Firstly, the landing gear is not retractable so creates drag during cruise of the aircraft. Secondly, the landing gear is not suitable for use on a large aircraft because it is too heavy. Thirdly, it has poor lateral stability, as there is very little damping present. Fourthly, as the composite leg bends upwards the wheel splays outwards, causing undesirable stresses in the wheel assembly.

Conventionally, in a retractable landing gear for a larger aircraft, an oleo-pneumatic shock absorber is provided to absorb the majority of the landing loads. Although effective, the oleo-pneumatic shock absorber suffers from a number of problems, including: gas leakage; oil leakage; incorrect servicing; seal wear; friction; temperature effects; corrosion; and need for maintenance. Also the gas laws limit the degree to which the load/deflection characteristic of the oleo-pneumatic shock absorber can be tuned.

SUMMARY OF THE INVENTION

A first aspect of the invention provides an aircraft landing gear comprising: an arm mounted to a pivot and carrying one or more wheel assemblies; and a composite leaf spring which is coupled to the arm and arranged to provide a resilient biasing force which opposes rotation of the arm about the pivot.

A second aspect of the invention provides a method of absorbing landing loads of an aircraft, the method comprising: contacting the ground with one or more wheel assemblies carried by an arm which is mounted to a pivot; rotating the arm about the pivot with the landing loads; and opposing rotation of the arm about the pivot with a composite leaf spring which is coupled to the arm.

The arm can be made relatively stiff in comparison with the leaf spring, so that load is transferred directly into the pivot without a large amount of bending of the leg. The leaf spring shock absorber typically has a reduced part count compared with a conventional oleo-pneumatic shock absorber. By forming the leaf spring from a composite material, its weight is significantly reduced in comparison with a conventional metal spring, making it suitable for use on a relatively large aircraft (for instance an aircraft weighing more than 10 tonnes).

The landing gear may be non-retractable, but more preferably the landing gear further comprises a retraction actuator for moving the landing gear relative to a body of an aircraft between a deployed position and a retracted position. The retraction actuator may retract the landing gear by moving the pivot, by rotating the arm about the pivot, or both.

In the case where the retraction actuator rotates the arm about the pivot, then a releasable locking mechanism may be provided to ensure that little or no energy is stored in the leaf spring as the landing gear is retracted. The locking mechanism can thus be locked when the landing gear is in its deployed position to enable the leaf spring to provide a resilient biasing force which opposes rotation of the arm about the pivot, and released to enable the retraction actuator to rotate the arm about the pivot. Typically the locking mechanism is coupled to a proximal end of the leaf spring, although other coupling arrangements may be possible. In the embodiment described below the locking mechanism comprises a two-bar link with a lockable central pivot.

The leaf spring typically has a distal end coupled to the arm and a proximal end coupled to a support which may be fixed or retractable relative to the body of the aircraft. The distal end of the spring may be coupled to a proximal end of the arm, or may be coupled to the arm at a point between the pivot and the wheel assembly. The spring may be coupled to the arm by a fixed attachment, by a sliding connection, or by some other coupling arrangement.

A proximal end of the leaf spring may be directly coupled to the support, or more preferably it is coupled via a swinging link which reduces the build up of tensile forces in the spring.

The arm may position the wheel assembly directly vertically below the pivot when the landing gear is in its deployed position and the aircraft is on the ground. However more preferably the arm positions the wheel assembly such that it is horizontally offset aft and/or outboard from the pivot when the landing gear is in its deployed position and the aircraft is on the ground. This horizontal offset means that the weight of the aircraft generates a moment which tends to rotate the arm about the pivot (and which is opposed by the action of the leaf spring).

Typically the arm and/or the leaf spring comprises a series of elements (such as fibres, plies or other elements) running along its length. Where the arm and leaf spring are formed together as a single piece, then at least one of the elements may run between the arm and the leaf spring, optionally continuously from a distal end of the arm to a proximal end of the leaf spring.

The composite material forming the leaf spring may comprise a carbon-fibre reinforced epoxy resin, a composite material formed from individual metallic coated carbon fibres compressed together, or any other suitable composite material.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
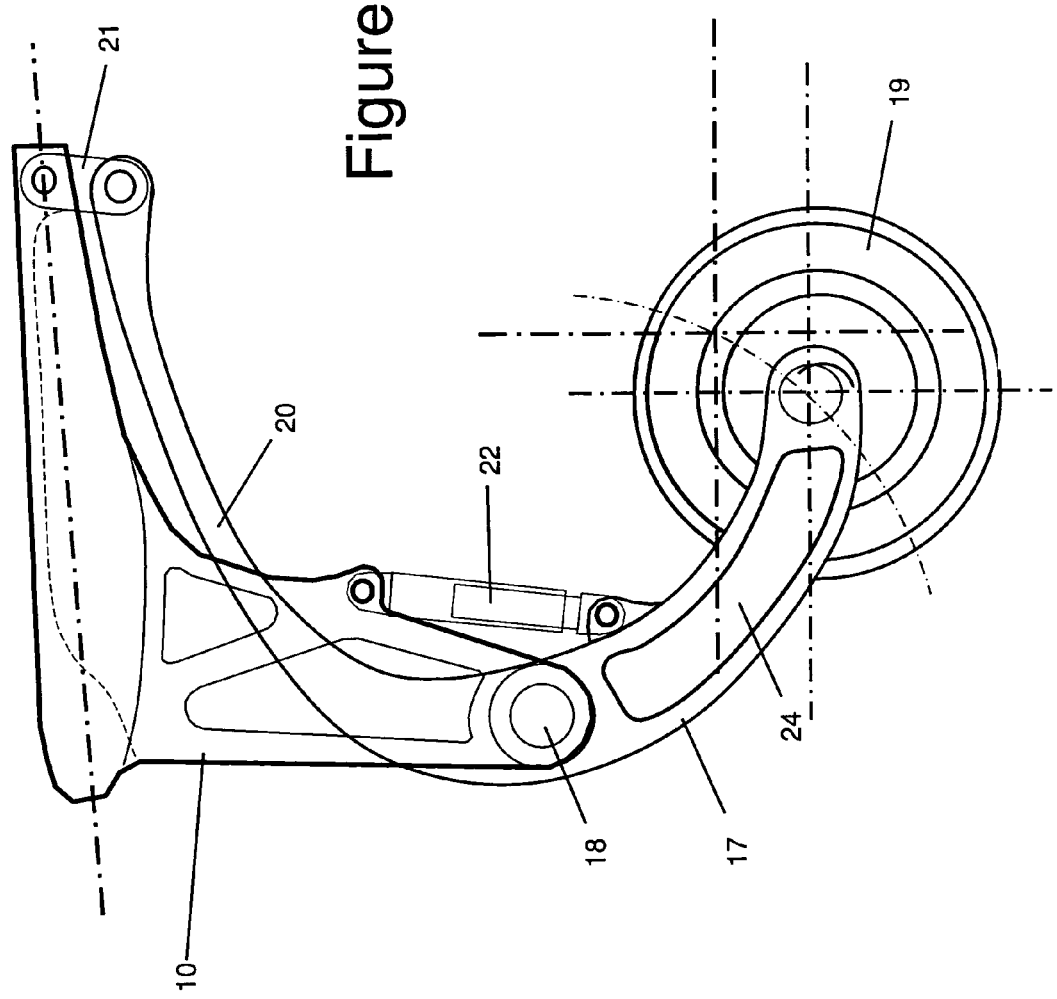
FIG. 1 is a side view of a landing gear according to a first embodiment of the invention.
Figure 2:
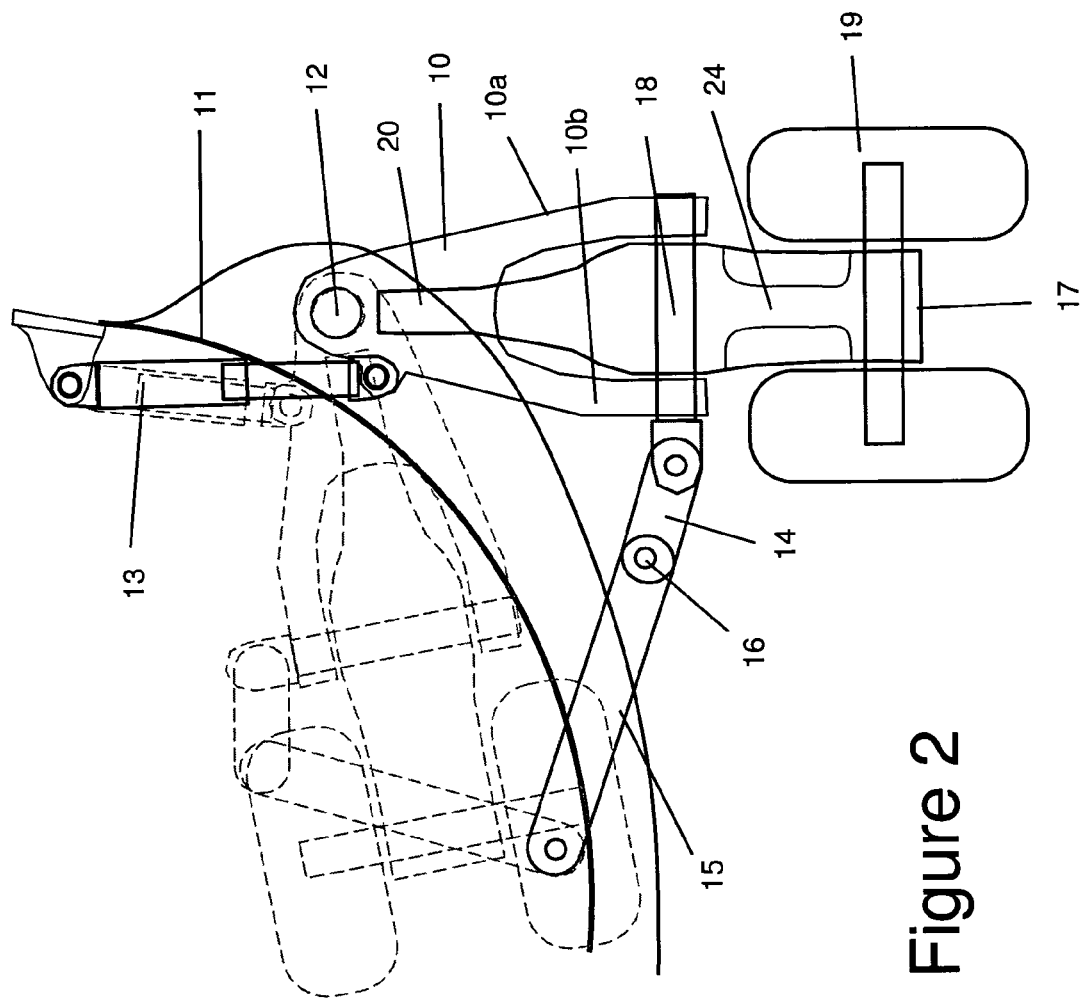
FIG. 2 is a front view showing the landing gear of FIG. 1 in its deployed and retracted positions.
Figure 3:
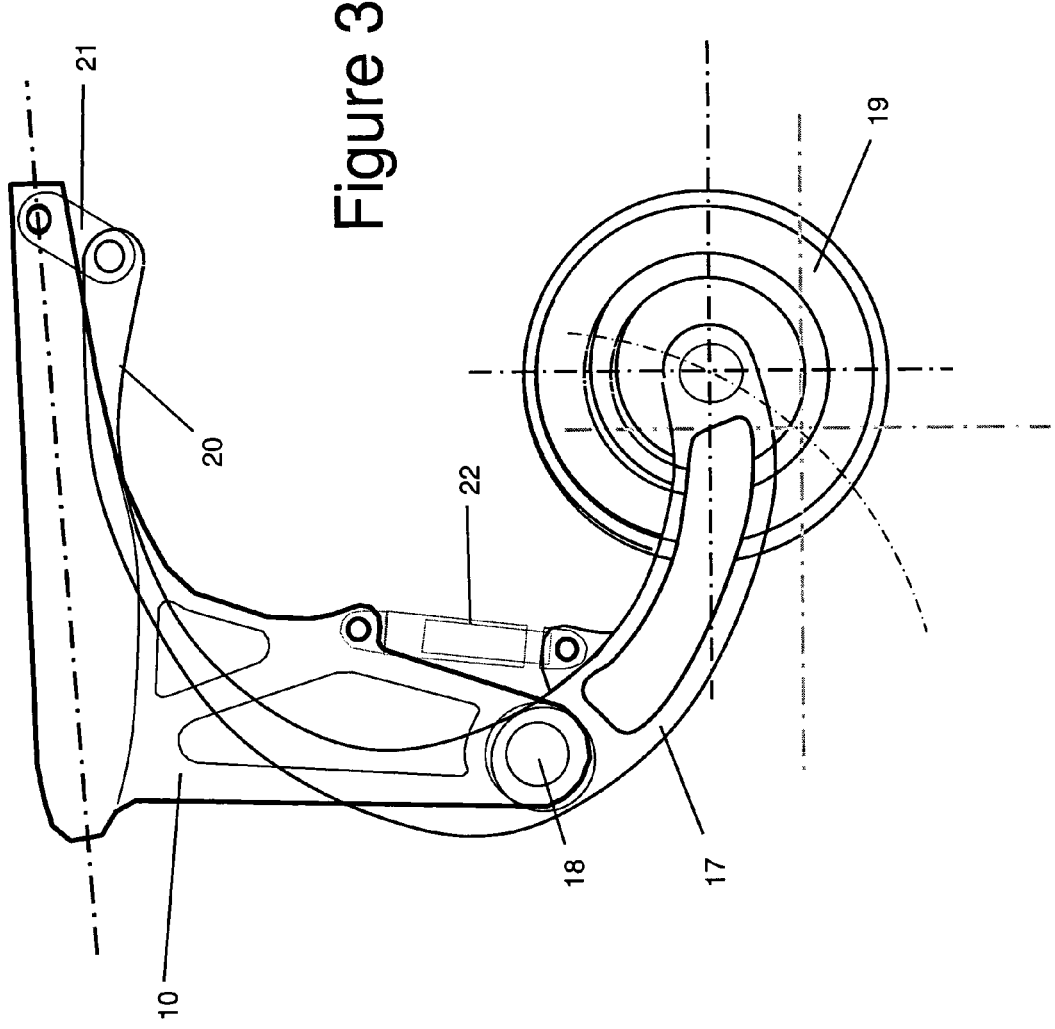
FIG. 3 is a side view showing the landing gear bending under the action of a landing load.

An aircraft landing gear shown in FIGS. 1-3 comprises a retractable support 10 pivotally attached to the body 11 of an aircraft at a body pivot 12. An electric or hydraulic linear retraction actuator 13 can rotate the support 10 about the body pivot 12 between a deployed position shown in FIG. 2 in solid line and a retracted position shown in FIG. 2 in dashed line. A pair of links 14, 15 with a central pivot joint 16 can be locked to fix the support 10 in its deployed position. A separate uplock (not shown) may be used to maintain the support in its retracted position, or the links 14, 15 may lock with the gear in the retracted position. The lock can be effected by either locking the joint 16 or an additional set of lock links attaching joint 16 to another point on the support 10 or airframe.

The support 10 has a pair of clevis arms 10a, 10b which carry a pivot 18. A rigid arm 17 is pivotally mounted to the support 10 by the pivot 18 and carries a double wheel assembly 19 at its distal end. The arm 17 is formed as a single piece with a leaf spring shock absorber 20 which extends on an opposite side of the pivot 18. A swinging link 21 is pivotally coupled to the proximal end of the leaf spring 20 at one end and to the support 10 at its other end.

The arm 17 and leaf spring 20 are formed from a series of plies of composite material, such as carbon-fibre reinforced epoxy resin. Some of the plies of composite material may run continuously from the distal end of the arm 17 to the proximal end of the leaf spring 20.

The arm 17 is a trailing arm. That is, it extends down and to the rear at an acute angle from the pivot 18 as shown in FIG. 1 when the support is in its deployed position and the aircraft is on the ground, positioning the axle of the wheel assembly 19 aft of the pivot 18.

A damping element 22 is pivotally coupled to the arm 17 and to the support 10. The damping element may be a pressurised oleo-pneumatic dashpot, or any other suitable kind of damping element.

As the wheels contact the ground with the landing gear in the deployed position shown in FIG. 1, the arm 17 rotates up about the pivot 18 and the leaf spring 20 bends as shown in FIG. 3 to provide a resilient biasing force which opposes rotation of the arm 17 about the pivot 18. The swinging link 21 also rotates as shown in FIG. 3 to minimise tensile load in the leaf spring 20. The damping element 22 provides a damping force on the arm 17 in parallel with the resilient biasing force provided by the leaf spring 20.

The arm 17, being relatively rigid in comparison with the leaf spring 20, transmits side loads to the pivot 18 without significant bending. The stiffness-to-weight ratio of the arm 17 is maximised by forming it with a relatively thin central web 24. Alternatively the arm 17 could be formed with a tubular or oval construction.

The leaf spring 20 has a "tunable" spring rate to minimise loads into the airframe. That is, the characteristics of the leaf spring 20 and the trailing arm 24 can be adapted by specific structural design to optimise the load/deflection characteristic.

Figure 4:
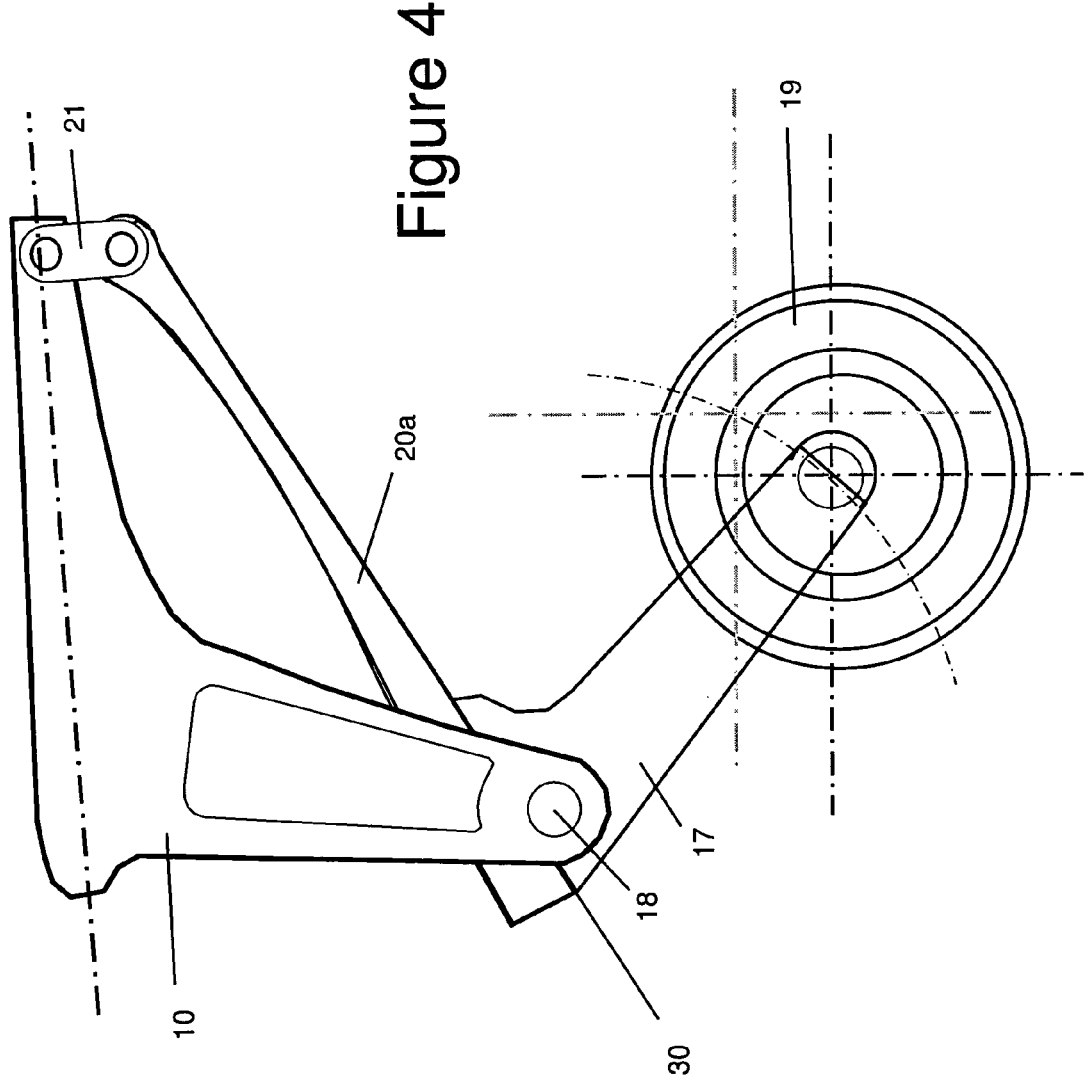
FIG. 4 is a side view showing an alternative landing gear where the composite leaf spring is formed separately from the arm.

FIG. 4 shows an alternative landing gear with equivalent features being indicated with the same reference numerals. In this case the arm 17 and leaf spring 20a are not formed integrally, but instead they are formed as separate parts and joined together at a joint 30 by bolts, adhesive or co-curing.

Figure 5:
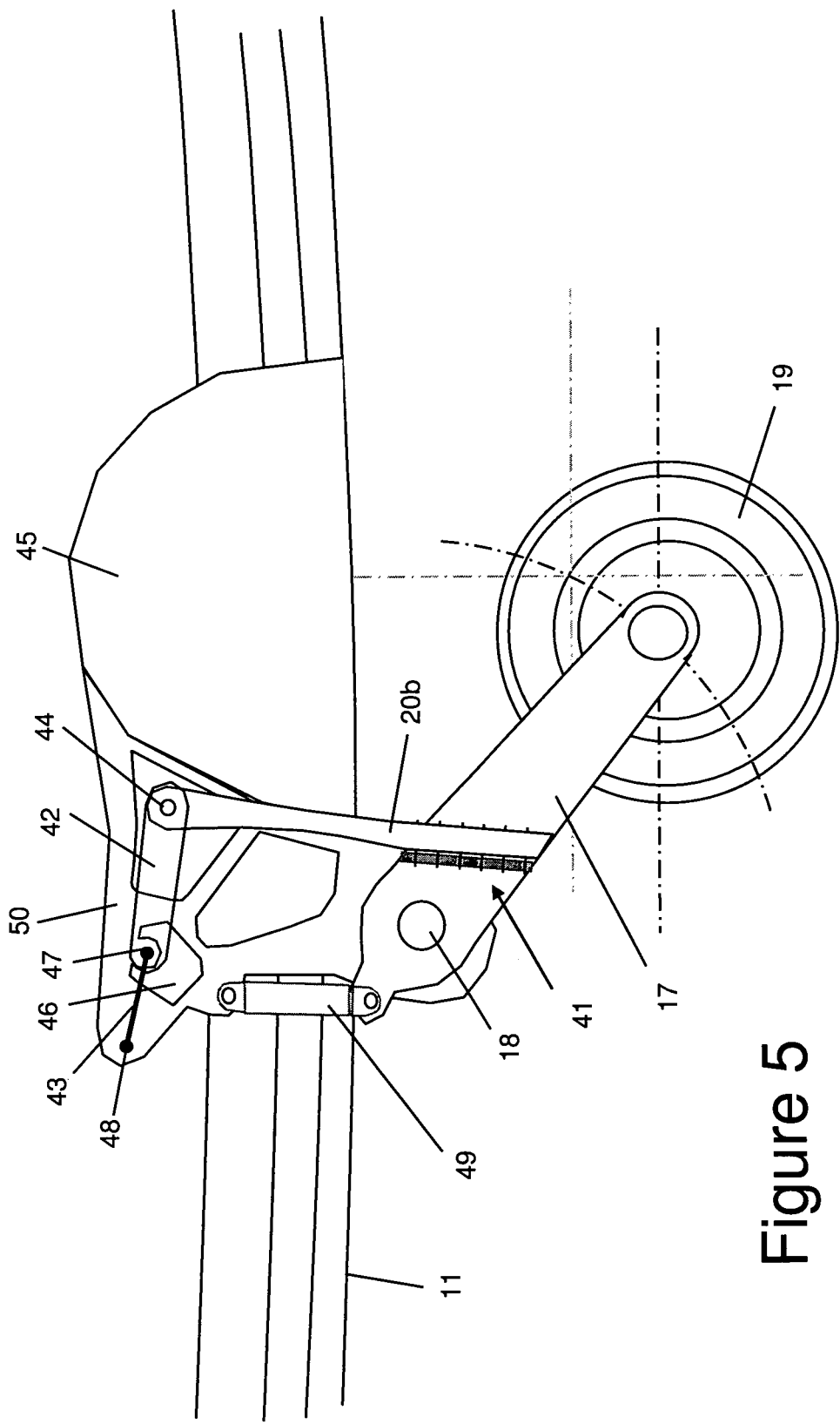
FIG. 5 is a side view showing a second alternative landing gear in its fully deployed position.
Figure 6:
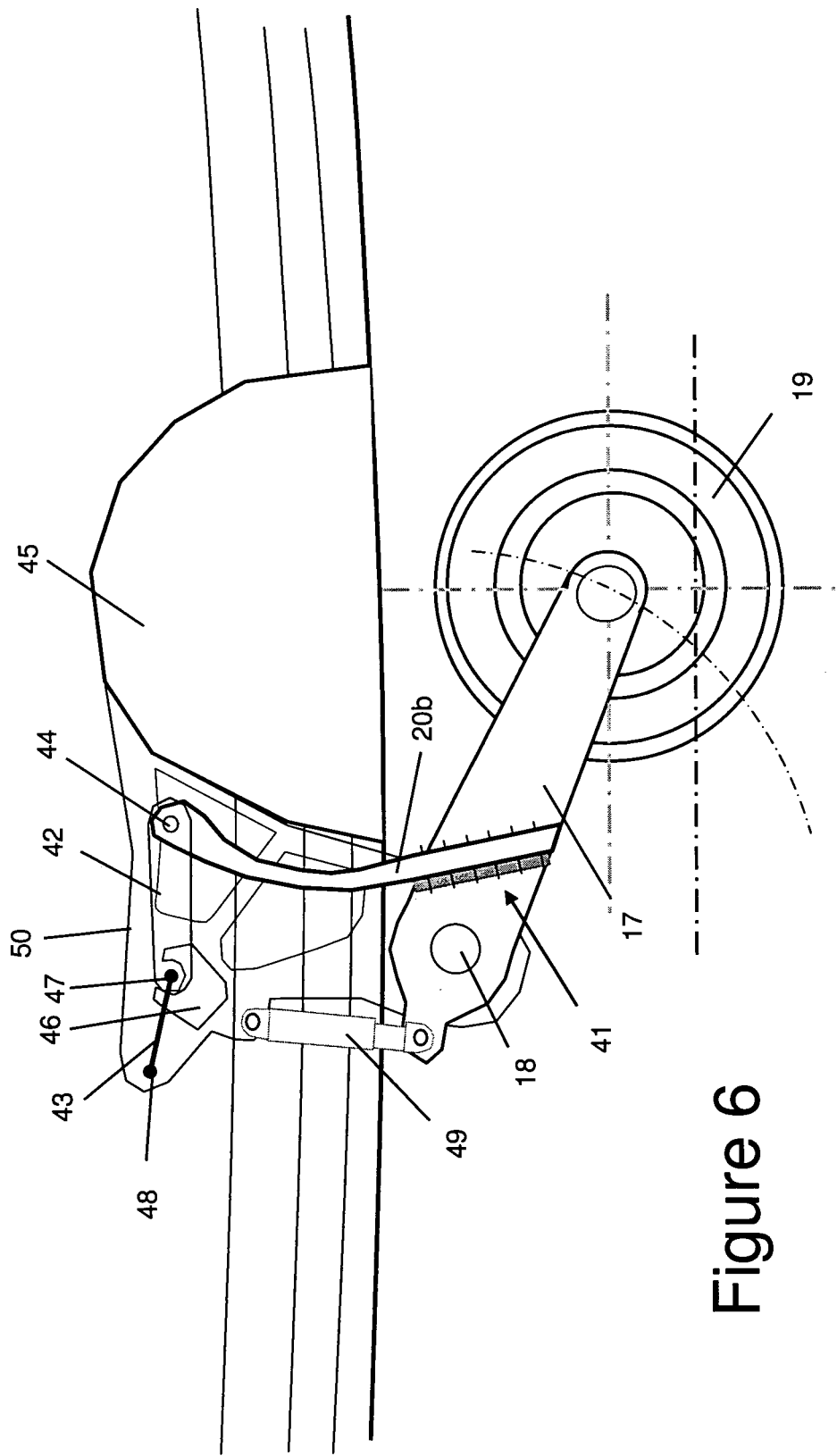
FIG. 6 is a side view of the second alternative landing gear with the composite leaf spring bending under the action of a landing load.
Figure 7:
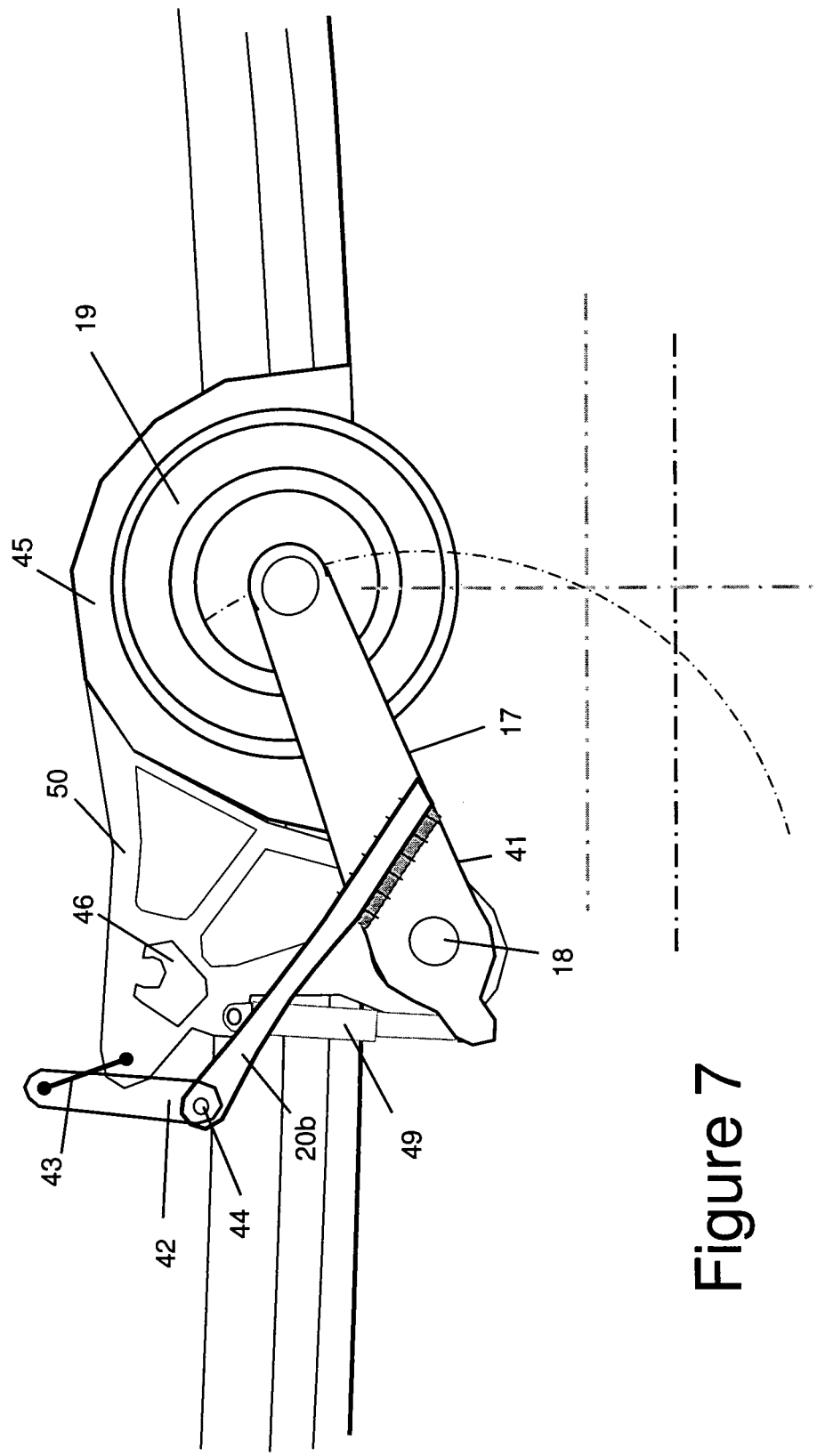
FIG. 7 is a side view of the second alternative landing gear in its retracted position.

FIGS. 5-7 show a further alternative landing gear with equivalent features being indicated with the same reference numerals. In this case, the arm 17 of the landing gear is pivotally attached to a non-retractable support 50 which is either attached to, or an integral part of, the body 11 of the aircraft.

A combined hydraulic damper/retraction actuator 49 is pivotally mounted to the support 50 and a lug on the proximal end of the arm 17.

The distal end of a composite leaf spring 20b is coupled to the arm 17 with fasteners 41 at a position along the length of the arm 17 between pivot 18 and wheel assembly 19. The proximal end of the leaf spring 20b is coupled to the support 50 by a releasable locking mechanism comprising a pair of links 42,43 connected by a lockable central pivot joint 47. Link 42 is pivotally coupled to the leaf spring 20b by a pivot 44, and link 43 is pivotally coupled to the support 50 by a pivot 48.

FIG. 5 shows the landing gear in its fully deployed position where the wheel assembly is positioned directly vertically below a storage space 45. The two-bar link is locked in this position by the action of a mechanical down-lock 46 on the central pivot joint 47. As the wheels contact the ground, the arm 17 rotates about the pivot 18 and the leaf spring 20b bends as shown in FIG. 6 to absorb the landing loads. The hydraulic unit 49 provides a damping force on the arm 17 in parallel with the resilient biasing force provided by the leaf spring 20b.

When the landing gear is retracted after takeoff, the pivot joint 47 is released by the mechanical down-lock 46. This enables the hydraulic unit 49 to be actuated and extend to rotate the arm 17 into the retracted position shown in FIG. 7. As the arm 17 retracts, the two-bar link mechanism 42,43 folds into the contracted configuration shown in FIG. 7. This ensures that little or no energy is stored in the leaf spring 20b as the landing gear is retracted. Note that the downlock device 46 and perhaps the links 42,43 are offset in an "in or out of the page" sense as the link 43 sweeps past the pivot point 48.

In a variant of the embodiments described above, damping can be performed within the composite leaf spring itself. For example, the composite leaf spring can be made hollow, and the internal void contains a damping material such as modified rubber with small cavities filled with a fluid. This fluid increases the damping effect of the rubber so the damping would be provided by "squeezing" of the rubber as the spring deflects. In the case of the embodiment of FIG. 1 this would enable the damping element 22 to be removed, thus eliminating another source of leakage (fluid from the damping element 22).

Although the invention has been described above with reference to one or more preferred embodiments, it will be appreciated that various changes or modifications may be made without departing from the scope of the invention as defined in the appended claims.

The invention claimed is:

1. An aircraft landing gear comprising: an arm mounted to a pivot and carrying one or more wheel assemblies; a composite leaf spring having a first end and a second end which is coupled to the arm at the first end and arranged to provide a resilient biasing force which opposes rotation of the arm about the pivot; a support carrying the pivot; and a swinging link, one end of which is pivotally coupled to the second end of the leaf spring and the other end of the swinging link is pivotally coupled to the support.

2. The landing gear of claim 1 further comprising a retraction actuator for moving the landing gear relative to a body of an aircraft between a deployed position and a retracted position.

3. The landing gear of claim 2 wherein the retraction actuator moves the landing gear relative to a body of an aircraft between a deployed position and a retracted position by moving the pivot.

4. The landing gear of claim 3 further comprising a retractable support carrying the pivot, wherein the leaf spring has one end coupled to the arm and another end coupled to the support via the swinging link.

5. The landing gear of claim 2 wherein the retraction actuator moves the landing gear relative to a body of an aircraft between a deployed position and a retracted position by rotating the arm about the pivot.

6. The landing gear of claim 5 further comprising a releasable locking mechanism which is coupled to the leaf spring and can be locked when the landing gear is in its deployed position to enable the leaf spring to provide a resilient biasing force which opposes rotation of the arm about the pivot, and released to enable the retraction actuator to rotate the arm about the pivot.

7. The landing gear of claim 1 wherein the arm positions the wheel assembly such that it is horizontally offset from the pivot when the aircraft is on the ground.

8. The landing gear of claim 7 wherein the arm is a trailing arm which positions the wheel assembly aft of the pivot when the aircraft is on the ground.

9. The landing gear of claim 1 further comprising a damping element which is coupled to the arm and arranged to provide a damping force when the arm rotates about the pivot.

10. The landing gear of claim 9 wherein the damping element can be actuated to move the landing gear relative to a body of an aircraft between a deployed position and a retracted position.

11. The landing gear of claim 1 wherein the arm and the leaf spring are manufactured together as a single piece.

12. The landing gear of claim 1 wherein the arm and the leaf spring comprise a plurality of elements running along their lengths and at least one of the elements runs continuously between the arm and the leaf spring.

13. The landing gear of claim 1 wherein the leaf spring is coupled to the arm at a position along its length between the pivot and the wheel assembly.

14. The landing gear of claim 1 wherein the composite leaf spring comprises a damping material which provides a damping force when the leaf spring deflects.

15. The landing gear of claim 14 wherein the composite leaf spring is hollow with an internal void containing the damping material.

16. A method of absorbing landing loads of an aircraft, the method comprising: contacting the ground with one or more wheel assemblies carried by an arm which is mounted to a pivot, the pivot being carried by a support; rotating the arm about the pivot with the landing loads; opposing rotation of the arm about the pivot with a composite material leaf spring having a first end and a second end which is coupled to the arm at the first end; and rotating a swinging link, one end of which is pivotally coupled to the second end of the leaf spring and the other end of the swinging link is pivotally coupled to the support.

17. The method of claim 16, further comprising:
extending the one or more wheel assemblies away from a retracted location of the one or more wheel assemblies via landing gear extension prior to the action of contacting the ground.

18. The landing gear of claim 1, wherein the arm and the leaf spring are a single component.

19. The landing gear of claim 1, wherein the swinging link is rotatably fixed to the leaf spring via the pivot.

20. The method of claim 16, wherein the arm and the leaf spring are a single component.

21. The method of claim 16, wherein the swinging link is rotatably fixed to the leaf spring via the pivot.

* * * * *